(12) United States Patent
Jung et al.

(10) Patent No.: US 9,099,739 B2
(45) Date of Patent: Aug. 4, 2015

(54) LITHIUM SECONDARY BATTERY

(75) Inventors: Won-Il Jung, Yongin-si (KR); Seon-Hye Kim, Yongin-si (KR)

(73) Assignee: Samsung SDI Co., Ltd., Gyeonggi-Do (KR)

( * ) Notice: Subject to any disclaimer, the term of this patent is extended or adjusted under 35 U.S.C. 154(b) by 448 days.

(21) Appl. No.: 13/535,109

(22) Filed: Jun. 27, 2012

(65) Prior Publication Data

US 2013/0101886 A1    Apr. 25, 2013

(30) Foreign Application Priority Data

Oct. 20, 2011    (KR) ........................ 10-2011-0107658

(51) Int. Cl.
| | | |
|---|---|---|
| *H01M 4/505* | (2010.01) | |
| *H01M 4/58* | (2010.01) | |
| *H01M 4/36* | (2006.01) | |
| *H01M 2/16* | (2006.01) | |
| *H01M 2/18* | (2006.01) | |
| *H01M 4/131* | (2010.01) | |
| *H01M 4/525* | (2010.01) | |
| *H01M 10/052* | (2010.01) | |
| *H01M 4/133* | (2010.01) | |
| *H01M 4/134* | (2010.01) | |
| *H01M 4/62* | (2006.01) | |
| *H01M 10/0525* | (2010.01) | |
| *H01M 10/0568* | (2010.01) | |
| *H01M 10/0569* | (2010.01) | |
| *H01M 10/0587* | (2010.01) | |

(52) U.S. Cl.
CPC ................ *H01M 4/505* (2013.01); *H01M 2/16* (2013.01); *H01M 2/1686* (2013.01); *H01M 2/18* (2013.01); *H01M 4/131* (2013.01); *H01M 4/366* (2013.01); *H01M 4/525* (2013.01); *H01M 4/5825* (2013.01); *H01M 10/052* (2013.01); *H01M 4/133* (2013.01); *H01M 4/134* (2013.01); *H01M 4/624* (2013.01); *H01M 10/0525* (2013.01); *H01M 10/0568* (2013.01); *H01M 10/0569* (2013.01); *H01M 10/0587* (2013.01); *Y02E 60/122* (2013.01); *Y02T 10/7011* (2013.01)

(58) Field of Classification Search
CPC ..... H01M 4/505; H01M 4/525; H01M 4/133; H01M 4/5825; H01M 4/366; H01M 10/0525; H01M 10/0568; H01M 10/0569; H01M 2/16; H01M 2/1686; H01M 2/18; H01M 4/134; Y02E 60/122; Y02T 10/7011
USPC ........... 429/145, 144, 249, 251, 231.1, 231.8, 429/332
See application file for complete search history.

(56) References Cited

U.S. PATENT DOCUMENTS

| | | | |
|---|---|---|---|
| 6,287,720 B1 * | 9/2001 | Yamashita et al. ............ | 429/145 |
| 6,423,447 B1 * | 7/2002 | Ohsaki et al. ................. | 429/217 |
| 6,447,958 B1 | 9/2002 | Shinohara et al. | |
| 7,892,673 B2 | 2/2011 | Hennige et al. | |
| 2009/0130547 A1 | 5/2009 | Lee et al. | |
| 2011/0111280 A1 | 5/2011 | Tamakoshi et al. | |

FOREIGN PATENT DOCUMENTS

| | | |
|---|---|---|
| JP | 2000-30686 A | 1/2000 |
| JP | 2009-123715 A | 6/2009 |
| KR | 10-2009-0050686 A | 5/2009 |

OTHER PUBLICATIONS

Le et al. "Investigation of positive electrode materials based on $MnO_2$ for lithium batteries"; Advances in Natural Sciences: Nanoscience and Nanotechnology (2011), 2(2), URL: http://iopscience.iop.org/2043-6262.*

* cited by examiner

*Primary Examiner* — Laura Weiner
(74) *Attorney, Agent, or Firm* — Knobbe Martens Olson & Bear LLP

(57) ABSTRACT

In one aspect, a lithium secondary battery that includes a positive electrode including a high-voltage positive active material; and a separator is provided. The high voltage positive active material can have a discharge plateau voltage of greater than or equal to about 4.6V with respect to a Li counter electrode, and the separator can include a porous substrate having a porosity of about 40% to about 60%.

16 Claims, 11 Drawing Sheets

LITHIUM SECONDARY BATTERY

CROSS-REFERENCE TO RELATED APPLICATION

This application claims priority to and the benefit of Korean Patent Application No. 10-2011-0107658 filed on Oct. 20, 2011 in the Korean Intellectual Property Office, the disclosure of which is incorporated in its entirety herein by reference.

BACKGROUND

1. Field

This disclosure relates to a lithium secondary battery.

2. Description of the Related Technology

A conventional lithium secondary battery can include a separator of an electric insulating porous film interposed between a positive electrode and a negative electrode, wherein an electrolyte containing a lithium salt is impregnated in the pores of film.

In the view of energy density, a conventional positive active material, such as $LiCoO_2$, can have difficulty in achieving high voltage. Therefore, development of substitute material has been ongoing. High voltage spinel manganese-based lithium oxide has drawn a lot of attention for its ability to achieve high voltage. However, high voltage spinel-based battery systems use a voltage range providing a potential in a region of around 5V, so the cell may be degraded when a conventional electrolyte and separator are used. For example, a conventional electrolyte and separator are used in a lithium secondary battery system using the potential region of 4.2V may cause rapid degradation of the cell. Further, the decomposition of electrolyte may be precipitated on the negative electrode (or positive electrode) when the positive electrode (or negative electrode) including transition elements is reacted with the electrolyte, or the separator may be oxidized and degraded, causing to deterioration to the rechargeable battery.

SUMMARY

One embodiment of this disclosure provides a lithium secondary battery having improved cycle-life characteristics, strength, and high temperature stability.

According to one embodiment of this disclosure, a lithium secondary battery that includes a positive electrode including a high-voltage positive active material and a separator is provided. In certain embodiments, the high voltage positive active material can have a discharge plateau voltage of greater than or equal to about 4.6V with respect to a Li counter electrode, and the separator includes a porous substrate having porosity of about 40% to about 60%.

In certain embodiments, the high-voltage positive active material may include a component selected from the group consisting of a compound represented by the following Chemical Formula 1, an olivine-based lithium metal phosphate, and a combination thereof.

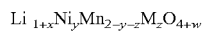   Chemical Formula 1 wherein,
0≤x≤0.2, 0.4≤y≤0.6, 0≤z≤0.2, 0≤w≤0.1, and
M is selected from the group consisting of Al, Ti, Mg, and Zn.

In certain embodiments, 0≤x≤0.1, 0.45≤y≤0.55, 0≤z≤0.2, 0≤w≤0.1

In certain embodiments, the high-voltage positive active material can be $LiNi_{0.5}Mn_{1.5}O_4$.

In certain embodiments, the separator may include a substrate of polyethylene, polypropylene, polyvinylidene fluoride, or a multilayer thereof. In certain embodiments, the porous substrate comprises polyethylene.

In certain embodiments, the separator may further include a coating layer on at least one side of the porous substrate.

In certain embodiments, the coating layer may include a polymer and a metal filler.

In certain embodiments, the metal filler may include a component selected from the group consisting of metal oxide, metal hydroxide, metal phosphate, metal nitrate, metal carbonate, metal sulfate, metal alkoxide, metal oxide having a perovskite structure, ceramics, and combinations thereof. In certain embodiments, the metal filler can be $MgCO_3$, $BaCO_3$, $Li_2CO_3$, $Al(OH)_3 \cdot H_2O$, $Al_2(SO_4)_3$, $MgSO_4$, $Al(OC_2H_5)_3$, $YPO_4$, $(ZrO)_2P_2O_7$, $ZrP_2O_7$, $Al(NO_3)_3$, a mixture of $Al_2(SO_4)_3$ and $Al(OC_2H_5)_3$, $LiAlO_2$, $LiAl_5O_8$, $Li_5AlO_4$, $MgO$, $MgAl_2O_4$, $BaTiO_3$, $CoAl_2O_4$, $Li_2SiO_4$, $Li_2B_4O_7$, $Li_2MoO_3$, $Al(OH)_3$, $AlPO_4$, $Mg(OH)_2$, a mixture of $Al_2O_3$ and $AlPO_4$, $Li_2ZrO_3$, a mixture of $Al_2O_3$ and $Al(OH)_3$, $AM^1O_3$ (A=Ca, Ba, Sr, Pb, and the like, $M^1$=Ti, Zr, Sn, Hf, and the like) or $Al_2O_3$. In certain embodiments, the metal filler can be $Al_2O_3$, or $Al(OH)_3$.

In certain embodiments, the polymer may include a component selected from the group consisting of polyvinylidenefluoride (PVdF), poly(vinylidene-hexafluoropropylene) (P(VdF-HFP)), polyethyleneoxide (PEO), polyacrylonitrile (PAN), polyimide (PI), polyamic acid (PAA), polyamideimide (PAI), and aramid. In certain embodiments, the polymer can be poly(vinylidene-hexafluoropropylene) co-polymer (P(VdF-HFP)).

In certain embodiments, the coating layer may include about 5 wt % to about 80 wt % of a metal filler based on 100 wt % of the coating layer.

In certain embodiments, the coating layer may have a thickness of about 0.05 μm to about 5 μm.

In certain embodiments, the separator may have a thickness of about 5 μm to about 30 μm.

In certain embodiments, the lithium secondary battery may further include a negative electrode including a negative active material selected from the group consisting of natural graphite, artificial graphite, soft carbon, hard carbon, a mesophase pitch carbonized product, fired coke, silicon oxide, or silicon oxide coated with conductive carbon, and combinations thereof.

In certain embodiments, the separator within the lithium secondary battery may include a substrate of at least one polyolefin-based single layer or multilayer; the lithium secondary battery may further include a non-aqueous electrolyte; and the non-aqueous electrolyte may include $LiPF_6$ as a supporting electrolytic salt. In certain embodiments, the non-aqueous electrolyte can be a mixture of ethyl carbonate, ethylmethyl carbonate and dimethyl carbonate.

In certain embodiments, the supporting electrolytic salt may be in a concentration of about 0.5M to about 2M in the non-aqueous electrolyte.

In certain embodiments, a lithium secondary battery having the parameters disclosed herein can have excellent cycle-life characteristic, strength, and high temperature stability.

DETAILED DESCRIPTION

Figure 1:
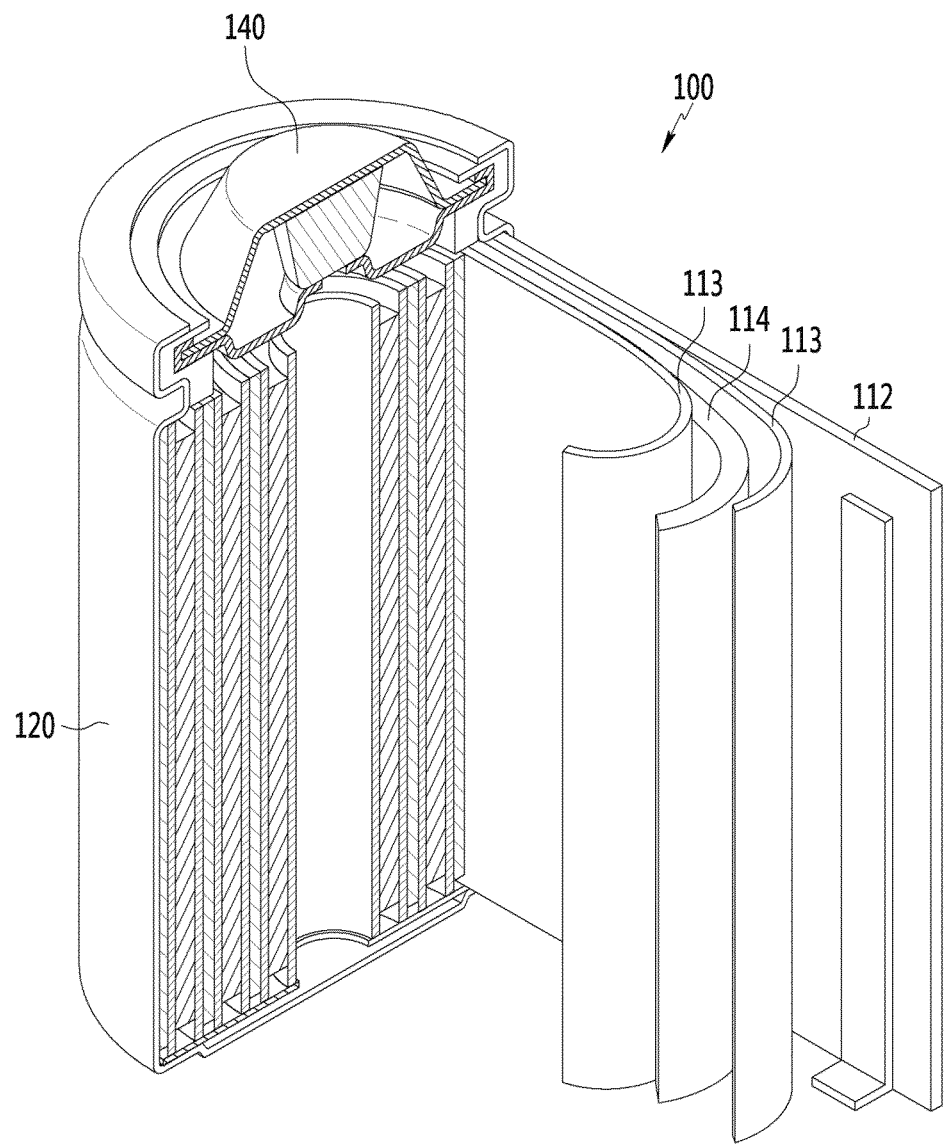
FIG. 1 is a schematic view showing a structure of a lithium secondary battery according to one embodiment.

Exemplary embodiments will hereinafter be described in detail. However, these embodiments are only exemplary, and the present invention is not limited thereto.

Some embodiments provide a lithium secondary battery including a positive electrode including a high-voltage positive active material and a separator.

In certain embodiments, the high-voltage positive active material may refer to an active material having a discharge plateau voltage of greater than or equal to about 4.6V with respect to a Li counter electrode. For example, the high-voltage positive active material may have a discharge plateau voltage of about 4.6V to about 5.3V.

In certain embodiments, the high-voltage positive active material may include a manganese-based lithium oxide, an olivine-based lithium metal phosphate such as LiCoPO$_4$, LiNiPO$_4$, etc., or a combination thereof having the discharge plateau voltage of greater than or equal to about 4.6V.

In certain embodiments, the manganese-based lithium oxide may be a compound represented by the following Chemical Formula 1.

$$Li_{1+x}Ni_yMn_{2-y-z}M_zO_{4+w}$$  Chemical Formula 1

In Chemical Formula 1, the variables can be defined as follows:

0≤x≤0.2, 0.4≤y≤0.6, 0≤z≤0.2, 0≤w≤0.1, and

M can be selected from the group consisting of Al, Ti, Mg, Zn, and combinations thereof. In another embodiment, 0≤x≤0.1, 0.45≤y≤0.55, 0≤z≤0.2, 0≤w≤0.1

A goal of pursuing eco-friendly energy has lead research to focus on new energy sources. Particularly, a lithium secondary battery as a high energy density and high performance as a main power source or an auxiliary power source for an electric vehicle or a hybrid vehicle is required to apply the stable electric power. For example, the manganese-based lithium oxide may have a high-voltage spinel structure and may be advantageously applied to a positive active material for a lithium secondary battery since the use voltage range provide a high potential of 5 V level. In certain embodiments, the lithium secondary battery in a high voltage lithium battery system may improve the drawback of cell degradation by including a separator including a porous substrate having a porosity of about 40% to about 60%.

The separator can be decomposed by the separator oxidation, and the decomposed product can fill in the pores of separator and stick to the surface of negative electrode to increase the interface resistance of between the separator and the negative electrode, so causing the degradation of charge and discharge characteristic, which causes more serious problems in the high voltage lithium secondary battery system.

In addition, a solvent of the electrolyte can be steadily decomposed by repeating cycles at a high temperature and in a high voltage region, particularly, when the high voltage lithium secondary battery system includes the positive active material of manganese-based lithium oxide, and when the cycles are repeated at a high temperature allowing elution of Mn$^{2+}$ ion from the surface of the positive electrode to be transferred into the electrolyte. The eluted manganese ion and the decomposed product of electrolyte can also be transferred to the negative electrode side and precipitated on the surface of negative electrode plate filling in the pores of separator or stuck on the surface of negative electrode increasing the interface resistance of the separator and the negative electrode, thereby the charge and discharge characteristic are deteriorated.

For example, the polyolefin-based separator such as polyethylene and polypropylene can be oxidized and decomposed by a radical having a high reactivity such as PF$_6$ radical to produce the radical, and the oxidation reaction steadily occurs in the main chain of a polymer such as polyethylene or polypropylene, etc. The oxidation can completely decompose the polymer to produced carbon degradation products.

In certain embodiments, the lithium secondary battery can include a separator including a porous substrate so as to effectively solve the aforementioned problems of the high voltage lithium secondary battery system. In certain embodiments, the porosity of the porous substrate can be from about 40% to about 60%. In certain embodiments, the porosity of the porous substrate can be from about 48% to about 60%. For example, a separator having a high porosity of about 40% to about 60% has the excellent porosity and air permeability. Thus, the phenomenon of blocking the pores of separator caused by decomposing the solvent and producing/precipitating the side reaction production during cycles is lessened to improve battery function, particularly, the improvement is significantly accomplished at a high temperature atmosphere.

In certain embodiments, the substrate of the separator may be formed of polyolefin such as polyethylene, polypropylene, and the like, polyvinylidene fluoride or multi-layers thereof. Mixed multi-layers such as polyethylene/polypropylene double-layered separator, polyethylene/polypropylene/polyethylene triple-layered separator, polypropylene/polyethylene/polypropylene triple-layered separator, and the like may also be used without limitation.

In certain embodiments, the separator may further include a coating layer on at least one side of the porous substrate. In certain embodiments, the porosity of the porous substrate can be of about 48% to about 60%. The coating layer may include a polymer and a metal filler.

In certain embodiments, the separator further includes the coating layer, to compensate for loss of mechanical strength due to the high porosity, and poor open-circuit voltage (OCV) may be effectively prevented, and the negative electrode surface-separator bonding characteristic can be improved. In certain embodiments, the cell cycle-life characteristics, the strength, and the defects may be improved by including a coating layer.

In certain embodiments, the metal filler may be a metal oxide, metal hydroxide, metal phosphate, metal nitrate, metal carbonate, metal sulfate, metal alkoxide, metal oxide having a perovskite structure, ceramics such as crystalline glass, and the like. For example, the metal filler may include MgCO$_3$, BaCO$_3$, Li$_2$CO$_3$, Al(OH)$_3$.H$_2$O, Al$_2$(SO$_4$)$_3$, MgSO$_4$, Al(OC$_2$H$_5$)$_3$, YPO$_4$, (ZrO)$_2$P$_2$O$_7$, ZrP$_2$O$_7$, Al(NO$_3$)$_3$, a mixture of $Al_2(SO_4)_3$ and $Al(OC_2H_5)_3$, $LiAlO_2$, $LiAl_5O_8$, $Li_5AlO_4$, MgO, $MgAl_2O_4$, $BaTiO_3$, $CoAl_2O_4$, $Li_2SiO_4$, $Li_2B_4O_7$, $Li_2MoO_3$, $Al(OH)_3$, $AlPO_4$, $Mg(OH)_2$, a mixture of $Al_2O_3$ and $AlPO_4$, $Li_2ZrO_3$, a mixture of $Al_2O_3$ and $Al(OH)_3$, $AM^1O_3$ (A=Ca, Ba, Sr, Pb, and the like, INV=Ti, Zr, Sn, Hf, and the like), $Al_2O_3$, and the like, or a combination thereof In certain embodiments, the metal filler may be mixed with a polymer resin as a particle, or it may provide a layer by a general method of, for example, preparing a resin composition solution including the metal filler and a polymer resin and coating the same on at least one surface of separator. In certain embodiments, the metal filler may include a particle having an average particle diameter of, for example, about 0.05 μm to about 2 μm. In certain embodiments, the average particle diameter can be from about 0.05 μm to about 0.1 μm, about 0.1 μm to about 0.5 μm, about 0.5 μm to about 1 μm, or 1 μm to about 2 μm.

In certain embodiments, the polymer may include polyvinylidenefluoride (PVdF), poly(vinylidene-hexafluoropropylene) (P(VdF-HFP)), polyethyleneoxide (PEO), polyacrylonitrile (PAN), polyimide (PI), polyamic acid (PAA), polyamideimide (PAI), aramid, or a combination thereof.

In certain embodiments, the coating layer may include a metal filler of about 5 wt % to about 80 wt % based on 100 wt % of the coating layer. In certain embodiments, the coating layer may include a metal filler of about 5 wt % to about 10 wt %, 10 wt % to about 20 wt %, 20 wt % to about 40 wt %, 40 wt % to about 60 wt %, or 60 wt % to about 80 wt % based on 100 wt % of the coating layer.

In certain embodiments, the thickness of coating layer may have an influence on the thickness of separator, so it is determined to correspond the thickness of separator. In certain embodiments, the cell resistance may be decreased and the capacity may be increased as the thickness of separator is thinner. In certain embodiments, the appropriate thickness may be set considering both aspects according to the purpose. For example, the coating layer may have a thickness of about 0.5 μm to about 5 μm. In certain embodiments, the coating layer may have a thickness of from about 0.5 μm to about 1 μm, about 1 μm to about 2 μm, about 2 μm to about 3 μm, about 3 μm to about 4 μm, or 4 μm to about 5 μm.

In certain embodiments, the thickness of the separator may be determined by the capacity of battery to be required. For example, the separator may have a thickness of about 5 μm to about 30 μm. In certain embodiments, the separator may have a thickness of from about 5 μm to about 15 μm, about 6 μm to about 15 μm, about 15 μm to about 20 μm, about 20 μm to about 25 μm, or 25 μm to about 30 μm.

Rechargeable lithium batteries may be classified as lithium ion batteries, lithium ion polymer batteries, and lithium polymer batteries according to the presence of a separator and the kind of electrolyte used in the battery. In certain embodiments, the rechargeable lithium batteries may have a variety of shapes and sizes and thus, include cylindrical, prismatic, or coin-type batteries and may be thin film batteries or rather bulky in size.

FIG. 1 is the exploded perspective view of a lithium secondary battery according to one embodiment. Referring to FIG. 1, the lithium secondary battery 100 is a cylindrical battery including a negative electrode 112, a positive electrode 114, a separator 113 interposed between the negative electrode 112 and the positive electrode 114, an electrolyte (not shown) impregnating the separator 113, a battery case 120, and a sealing member 140 sealing the battery case 120. The negative electrode 112, positive electrode 114, and separator 113 are sequentially stacked, spirally wound, and placed in a battery case 120 to fabricate such a lithium secondary battery 100.

In certain embodiments, the negative electrode can include a current collector and a negative active material layer formed on the current collector. In certain embodiments, the negative active material layer can include a negative active material.

In certain embodiments, the negative active material can include a material that reversibly intercalates/deintercalates lithium ions, a lithium metal, a lithium metal alloy, a material being capable of doping and dedoping lithium, or a transition metal oxide.

In certain embodiments, the material that may reversibly intercalate/deintercalate lithium ions includes a carbon material. In certain embodiments, the carbon material may be any carbon-based negative active material generally used in a lithium ion rechargeable battery. Examples of the carbon material include, but are not limited to, crystalline carbon, amorphous carbon, and mixtures thereof. In certain embodiments, the crystalline carbon may be non-shaped, or sheet, flake, spherical, or fiber-shaped natural graphite or artificial graphite. In certain embodiments, the amorphous carbon may be a soft carbon, a hard carbon, a mesophase pitch carbonized product, fired coke, and the like.

Examples of the lithium metal alloy include lithium and a metal selected from Na, K, Rb, Cs, Fr, Be, Mg, Ca, Sr, Si, Sb, Pb, In, Zn, Ba, Ra, Ge, Al, and Sn.

Examples of the material being capable of doping lithium include Si, $SiO_x$ (0<x<2), a Si-Q alloy (wherein Q is an element selected from an alkali metal, an alkaline-earth metal, group 13 to 16 elements, a transition element, a rare earth element, or a combination thereof, and is not Si), Sn, $SnO_2$, a Sn-R alloy (wherein R is an element selected from an alkali metal, an alkaline-earth metal, group 13 to 16 elements, a transition element, a rare earth element, or a combination thereof, and is not Sn), or mixtures thereof. At least one of these materials may be mixed with $SiO_2$. In certain embodiments, the elements Q and R may be selected from Mg, Ca, Sr, Ba, Ra, Sc, Y, Ti, Zr, Hf, Rf, V, Nb, Ta, Cr, Mo, W, Tc, Re, Fe, Pb, Ru, Os, Rh, Ir, Pd, Pt, Cu, Ag, Au, Zn, Cd, B, Al, Ga, Sn, In, Ti, Ge, P, As, Sb, Bi, S, Se, Te, Po, and a combination thereof.

Examples of the transition metal oxide include vanadium oxide, lithium vanadium oxide, and the like.

In certain embodiments, the negative active material layer also includes a binder and optionally a conductive material.

In certain embodiments, the binder improves binding properties of the negative active material particles to one another and also, with a current collector. Examples of the binder include polyvinylalcohol, carboxylmethylcellulose, hydroxypropylcellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

In certain embodiments, the conductive material is included to improve electrode conductivity. Any electrically conductive material may be used as a conductive material unless it causes a chemical change. Examples of the conductive material include, but are not limited to, carbon-based materials such as natural graphite, artificial graphite, carbon black, acetylene black, ketjen black, a carbon fiber, and the like; a metal-based material such as a metal powder or a metal fiber including copper, nickel, aluminum, silver, and the like; a conductive polymer such as polyphenylene derivative, and the like; or mixtures thereof.

In certain embodiments, the current collector may be selected from the group consisting of a copper film, a nickel film, a stainless steel film, a titanium film, a nickel foam, a copper foam, a polymer substrate coated with a conductive metal, and combinations thereof.

In certain embodiments, the positive electrode may include a current collector and a positive active material layer disposed on the current collector.

In certain embodiments, the positive active material can include lithiated intercalation compounds that reversibly intercalate and deintercalate lithium ions. In certain embodiments, the positive active material can be manganese-based lithium oxide.

In certain embodiments, the compound may have a coating layer on the surface or may be mixed with another compound having a coating layer. In certain embodiments, the coating layer can be made of a coating element compound and may include an oxide of a coating element, a hydroxide of the coating element, an oxyhydroxide of a coating element, an oxycarbonate of a coating element, and a hydroxyl carbonate of a coating element. In certain embodiments, the compound for a coating layer may be amorphous or crystalline. In certain embodiments, the coating element for a coating layer may include Mg, Al, Co, K, Na, Ca, Si, Ti, V, Sn, Ge, Ga, B, As, Zr, or a mixture thereof. In certain embodiments, the coating layer may be formed in a method having no adverse influence on properties of a positive active material by including these elements in the compound. For example, the method may include any coating method such as spraying, dipping, and the like known to those of skill in the art.

In certain embodiments, the positive active material layer also includes a binder and a conductive material.

The binder can improve binding properties of the positive active material particles to one another and also, with a current collector. Examples of the binder include at least one component selected from the group consisting of polyvinyl alcohol, carboxylmethyl cellulose, hydroxypropyl cellulose, diacetyl cellulose, polyvinylchloride, carboxylated polyvinyl chloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like but are not limited thereto.

In certain embodiments, the conductive material can be included to improve electrode conductivity. Any electrically conductive material may be used as a conductive material unless it causes a chemical change. Examples of the conductive material include, but are not limited to, one or more of carbon black, acetylene black, ketjen black, carbon fiber, a metal powder or a metal fiber including copper, nickel, aluminum, silver, and polyphenylene derivatives.

In certain embodiments, the current collector may be Al but is not limited thereto.

In certain embodiments, the negative and positive electrodes may be fabricated by mixing the active material, a conductive material, and a binder in a solvent into an active material composition and coating the composition on a current collector. The electrode manufacturing method is well known by those of skill in the art. In certain embodiments, the solvent may be N-methylpyrrolidone, but it is not limited thereto.

In certain embodiments, the electrolyte may include a non-aqueous organic solvent and a lithium salt.

In certain embodiments, the non-aqueous organic solvent can serve as a medium for transmitting ions taking part in the electrochemical reaction of a battery.

In certain embodiments, the non-aqueousorganic solvent may include a carbonate-based, ester-based, ether-based, ketone-based, alcohol-based, or aprotic solvent. Examples of the carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and so on. Examples of the ester-based solvent may include methyl acetate, 1,1'-dimethylethyl acetate, n-propyl acetate, dimethylacetate, methylpropionate, ethylpropionate, γ-butyrolactone, decanolide, valerolactone, mevalonolactone, caprolactone, and the like. Examples of the ether-based solvent include dibutyl ether, tetraglyme, diglyme, dimethoxyethane, 2-methyltetrahydrofuran, tetrahydrofuran, and so on, and examples of the ketone-based solvent include cyclohexanone and the like. Examples of the alcohol-based solvent include ethyl alcohol, isopropyl alcohol, and so on, and examples of the aprotic solvent include nitriles such as R-CN (wherein R is a C1 to C20 linear, branched, or cyclic hydrocarbon group that may include a double bond aromatic ring, or an ether bond), amides such as dimethylformamide, dioxolanes such as 1,3-dioxolane, sulfolanes, and the like.

In certain embodiments, the non-aqueous organic solvent may be used singularly or in a mixture. When the non-aqueous organic solvent is used in a mixture, the mixture ratio may be controlled in accordance with a desirable battery performance.

In certain embodiments, the carbonate-based solvent may include the mixture of a cyclic carbonate and a linear carbonate. The cyclic carbonate and the linear carbonate are mixed together in the volume ratio of about 1:1 to about 1:9. In certain embodiments, the electrolyte performance may be enhanced when the mixture is used as an electrolyte.

In certain embodiments, the electrolyte may further include mixtures of a carbonate-based solvent and an aromatic hydrocarbon-based solvent. The carbonate-based solvent and the aromatic hydrocarbon-based organic solvent may be mixed together in the volume ratio of about 1:1 to about 30:1.

In certain embodiments, the aromatic hydrocarbon-based organic solvent may be represented by the following Chemical Formula 2.

Chemical Formula 2

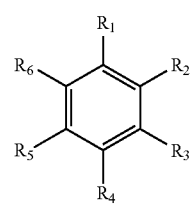

In Chemical Formula 2, $R_1$ to $R_6$ are each independently hydrogen, halogen, a C1 to C10 alkyl group, a C1 to C10 haloalkyl group, or a combination thereof.

The aromatic hydrocarbon-based organic solvent may include, but is not limited to, at least one selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, or a combination thereof.

In certain embodiments, the non-aqueous electrolyte may further include vinylene carbonate or an ethylene carbonate-based compound of the following Chemical Formula 3.

Chemical Formula 3

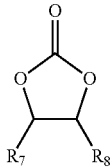

In Chemical Formula 3, $R_7$ and $R_8$ are each independently selected from the group consisting of hydrogen, a halogen, a cyano group (CN), a nitro group ($NO_2$), and a C1 to C5 fluoroalkyl group, provided that at least one of $R_7$ and $R_8$ is a halogen, a nitro group ($NO_2$), or a C1 to C5 fluoroalkyl group.

In certain embodiments, the ethylene carbonate-based compound may include difluoro ethylenecarbonate, chloroethylene carbonate, dichloroethylene carbonate, bromoethylene carbonate, dibromoethylene carbonate, nitroethylene carbonate, cyanoethylene carbonate, fluoroethylene carbonate, and the like. The use amount of the vinylene carbonate or the ethylene carbonate-based compound as an additive for improving cycle-life may be adjusted within an appropriate range.

In certain embodiments, the lithium salt supplies lithium ions in the battery, operates a basic operation of a lithium secondary battery, and improves lithium ion transportation between positive and negative electrodes. Examples of the lithium salt include, but are not limited to, at least one supporting salt selected from $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x-1}SO_2)(C_yF_{2y+1}SO_2)$ (where x and y are natural numbers, LiCl, LiI, $LiB(C_2O_4)_2$ (lithium bisoxalato borate; LiBOB), or a combination thereof. In certain embodiments, the lithium salt may be used at about 0.1 to about 2.0M concentration. In certain embodiments, the electrolyte performance and lithium ion mobility may be enhanced due to optimal electrolyte conductivity and viscosity when the lithium salt is included at about 0.1 to about 2.0M concentration.

In certain embodiments, the lithium secondary battery may further include a separator between a negative electrode and a positive electrode, as needed. The separator may be the same as described above.

Hereinafter, examples of one or more embodiments will be described in detail including comparative examples. However, these examples are not intended to limit the scope of the one or more embodiments.

EXAMPLES

Example 1

Poly(vinylidene-hexafluoropropylene) copolymer (P(VdF-HFP)) was dissolved in N-methyl-2-pyrrolidone (NMP) at a weight ratio of 6:100 and mixed with $Al_2O_3$ to provide a colloid type uniform mixture, and the mixture was coated on the both surfaces of polyethylene substrate having a porosity of 60% and a thickness of 20.0 μm in a thickness of 2 μm and dried to provide a separator having an entire thickness of 20 μm. At this time, the amount of $Al_2O_3$ was about 20 wt % based on the weight of the NMP. A coating layer including $Al_2O_3$ and P(VdF-HFP) was formed on the polyethylene substrate and the amount of $Al_2O_3$ was about 20 wt % based on 100 wt % of the coating layer.

A $LiNi_{0.5}Mn_{1.5}O_4$ active material having a particle size of 10 μm, a carbon-based conductive agent, and a fluorinated resin of polyvinylidene fluoride binder were mixed at a weight ratio of 94 : 3 : 3 using an N-methyl pyrrolidone solvent and coated on an Al current collector and then dried and pressed to provide a positive electrode plate. Separately, a negative electrode including an active material of graphite was fabricated. Subsequently, a 18650 cylindrical full cell was fabricated using the obtained positive electrode/negative electrode, an electrolyte having 1.3M concentration of $LiPF_6$ dissolved in a mixture of (3/3/4, volume ratio) of EC(ethyl carbonate)/EMC(ethylmethyl carbonate)/DMC(dimethyl carbonate), and the previously fabricated separator.

Example 2

A 18650 cylindrical full cell was fabricated in accordance with the same procedure as in Example 1, except that a separator included a polyethylene substrate having a porosity of 57% and a thickness of 19.0 μm.

Example 3

A 18650 cylindrical full cell was fabricated in accordance with the same procedure as in Example 1, except that a separator included a polyethylene substrate having a porosity of 48% and a thickness of 19.3 μm.

Comparative Example 1

A 18650 cylindrical full cell was fabricated in accordance with the same procedure as in Example 1, except that a separator included a polyethylene substrate having a porosity of 37% and a thickness of 20.0 μm with no coating layer.

Comparative Example 2

A 18650 cylindrical full cell was fabricated in accordance with the same procedure as in Example 1, except that a separator included a polyethylene substrate having a porosity of 40% and a thickness of 20.0 μm with no coating layer.

Comparative Example 3

A 18650 cylindrical full cell was fabricated in accordance with the same procedure as in Example 1, except that a separator included a polyethylene substrate having a porosity of 46% and a thickness of 20.0 μm with no coating layer.

Experimental Example 1

Mechanical Properties Evaluation of Separator

The separators obtained from Examples 1 to 3 and Comparative Examples 1 to 3 were measured for a thickness, air permeability, porosity, puncture strength, tensile strength, tensile elongation, and thermal shrinkage ratio, and the results are shown in the following Table 1. Each measuring standard is as follows:

(1) Thermal Shrinkage Ratio

A separator was cut by 15 cm along with a longitudinal direction (MD direction) to provide three specimens, and 10 cm line was drawn on the prepared specimens along with a longitudinal direction (MD direction) using a ball point pen. The length of the drawn line along with the MD direction of each specimen was precisely measured using a projector (or 3-D) until 0.1 cm unit.

The non-fixed separator specimens according to Examples 1 to 3 were inserted between two sheets of A4 paper, and the inside separator was not fixed while the edge was fixed by PI (polyimide) tape. The prepared specimen was flatly put in the bottom of an oven at a temperature of 120±1° C. and allowed to stand for 1 hour, and then the each specimen was precisely measured for the length of the drawn line along with the MD direction by 0.1 cm unit using a projector (or 3-D). The thermal shrinkage was calculated for the average of three specimens according to the following Equation, and the results are shown in the following Table 1.

Equation of Calculating Thermal Shrinkage Ratio

[(initial length−length after being allowed to stand in oven)/ initial length]×100

The end of the separator specimens of Comparative Examples 1 to 3 were clipped at the MD direction ands and hanged in an oven at a temperature of 105±1° C. for one hour. In this case, the lower end of specimen was worn with clips to prevent the flap in the wind. Each specimen was precisely measured for a MD direction line until 0.1 cm unit using a projector (or 3-D), and the thermal shrinkage was calculated with the average of three specimens according to Equation, and the results are shown in the following Table 1.

It was measured long with a TD direction (perpendicular direction to the length direction) according to the same method, and the results are shown in the following Table 1.

(2) Tensile Strength and Tensile Elongation

A 40 mm×10 mm size specimen was prepared. The specimen had the same size in the both directions (MD, TD). A thickness of specimen was measured and reported using a micrometer.

Setting Condition for Tensile Strength Tester

The tensile strength test was performed by under the condition of a tensile speed of 100 mm/min, the maximum loading level of 10 kg and the chuck interval of 20 mm. At this time, the precisions for maximum loading level and the maximum elongation were 0.1 kg and 0.1 mm, respectively.

The tensile strength was calculated by substituting the thickness and the maximum loading level with the following Equation, and the results are reported rounding to 1 kgf/cm² unit.

Equation of Calculating Tensile Strength

Tensile strength (kg/cm²)={(maximum load)/(thickness)}×10000

The tensile elongation was calculated by substituting the average of maximum elongation with the following Equation, and the results are reported rounding to 1% unit.

Equation of Calculating Tensile Elongation

Tensile elongation (%)={(maximum elongation)/20}×100

(3) Air Permeability

The air permeability was measured under the following setting condition using an analyzer of ASAHI SEIKO OKEN TYPE Air Permeation Tester EG01-55-1MR (Asahi Seiko Co., Ltd., Osaka Japan), and the results are shown in the following Table 1.

Setting Condition for Air Permeation Tester

Measuring pressure: 0.5 kg/cm², cylinder pressure: 2.5 kg/cm², set time: 10 seconds Data obtained by measuring 10 cm interval of 1m specimen for 10 times were averaged.

(4) Puncture Strength

Puncture strength was measured by a Handy-Type Compression Tester KES-G5 (KES Kato Tech Co., LTD., Kyoto Japan) (terminal end ø01.0mm metal pin) under the following setting condition, and the results are shown in the following Table 1.

Data obtained by measuring 10 cm intervals of 1m specimen for 10 times were averaged.

TABLE 1

|  | unit | Example 1 | Example 2 | Example 3 | Comparative Example 1 | Comparative Example 2 | Comparative Example 3 |
|---|---|---|---|---|---|---|---|
| Thickness of separator | μm | 20.0 | 19.0 | 19.3 | 20.0 | 20.0 | 21.0 |
| Air permeation | sec/100 cc | 50 | 193 | 135 | 286 | 249 | 171 |
| Porosity | % | 60 | 57 | 48 | 37 | 40 | 46 |
| Puncture strength | Kgf | 380 | 316 | 478 | 586 | 589 | 438 |
| Tensile strength MD | Kgf/cm² | 1700 | — | 1811 | 1718 | 1602 | 1073 |
| Tensile strength TD |  | 300 | — | 1055 | 1446 | 1537 | 631 |
| Tensile elongation MD | % | 35 | 137 | 96 | 143 | 174 | 71 |
| Tensile elongation TD |  | 120 | 72 | 229 | 222 | 202 | 112 |
| Thermal shrinkage ratio MD | % | — | 4.0 | 2.5 | 3.5 | 4.2 | — |
| Thermal shrinkage ratio TD |  | — | 3.0 | 1.0 | 1.0 | 5.5 | — |

Figure 2:
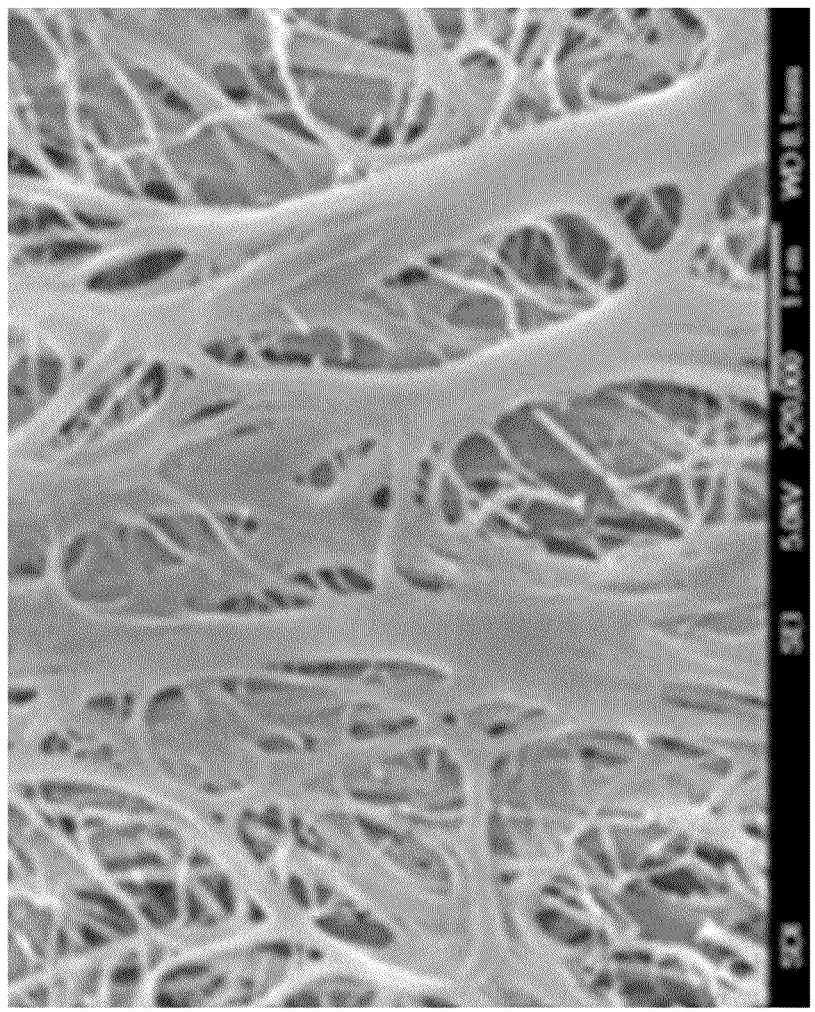
FIGS. 2 to 4 are SEM images of separators obtained from Examples 1 to 3, respectively.
Figure 3:
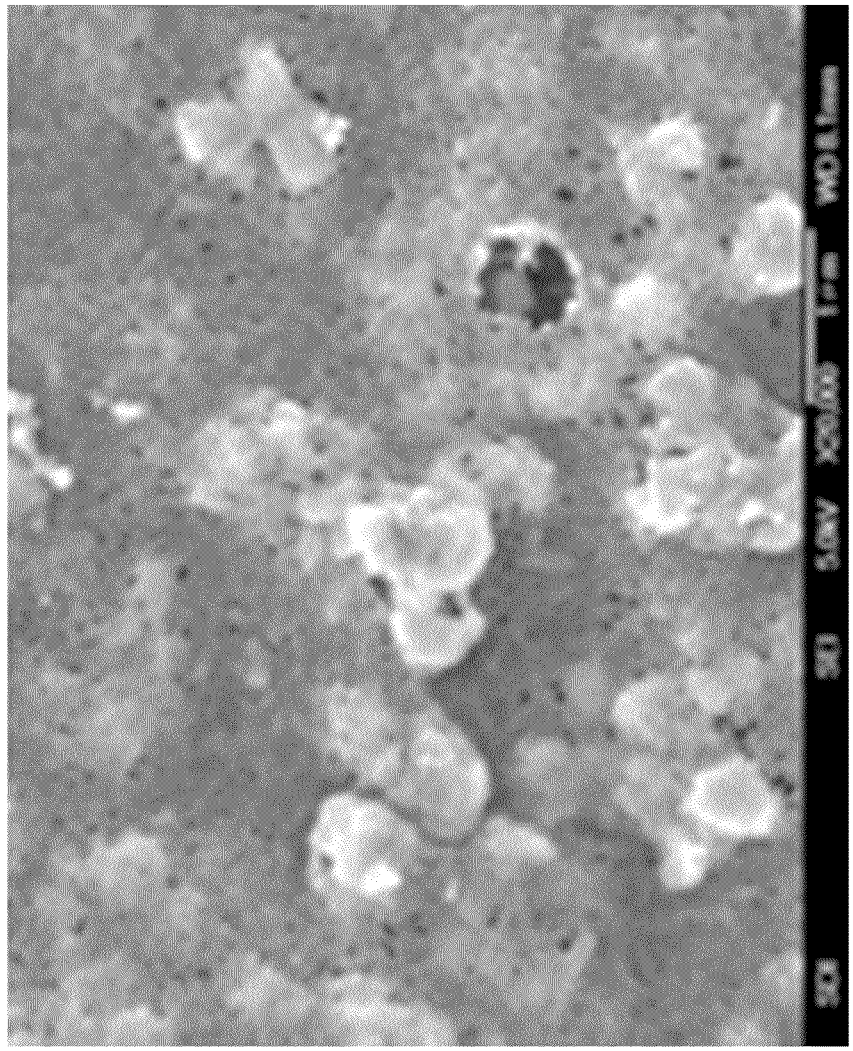
Figure 4:
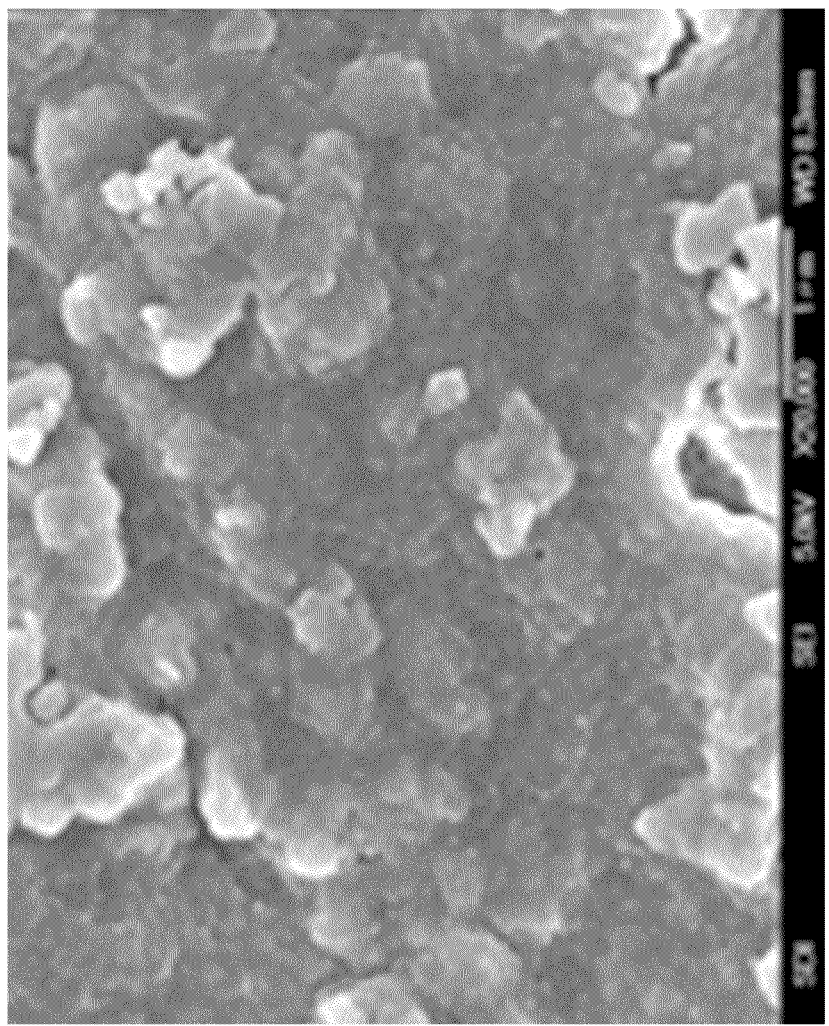

FIG. 2 to FIG. 4 are SEM images of separators obtained from Examples 1 to 3, respectively.

Figure 5:
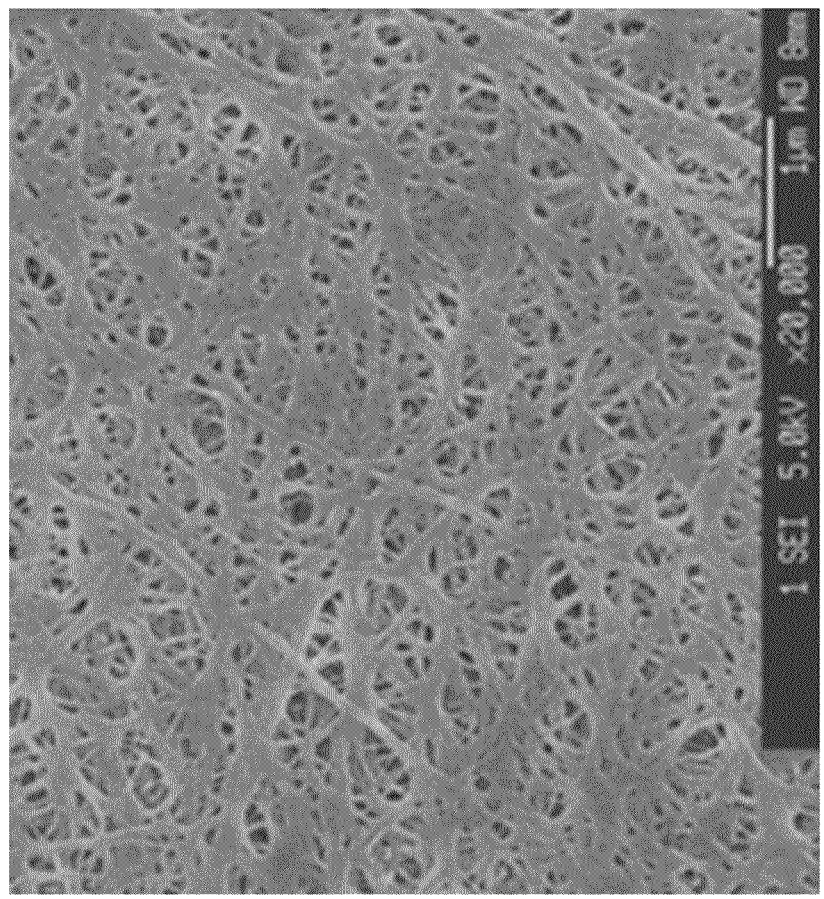
FIGS. 5 and 6 are SEM images of separators obtained from Comparative Example 1 and Comparative Example 2, respectively.
Figure 6:
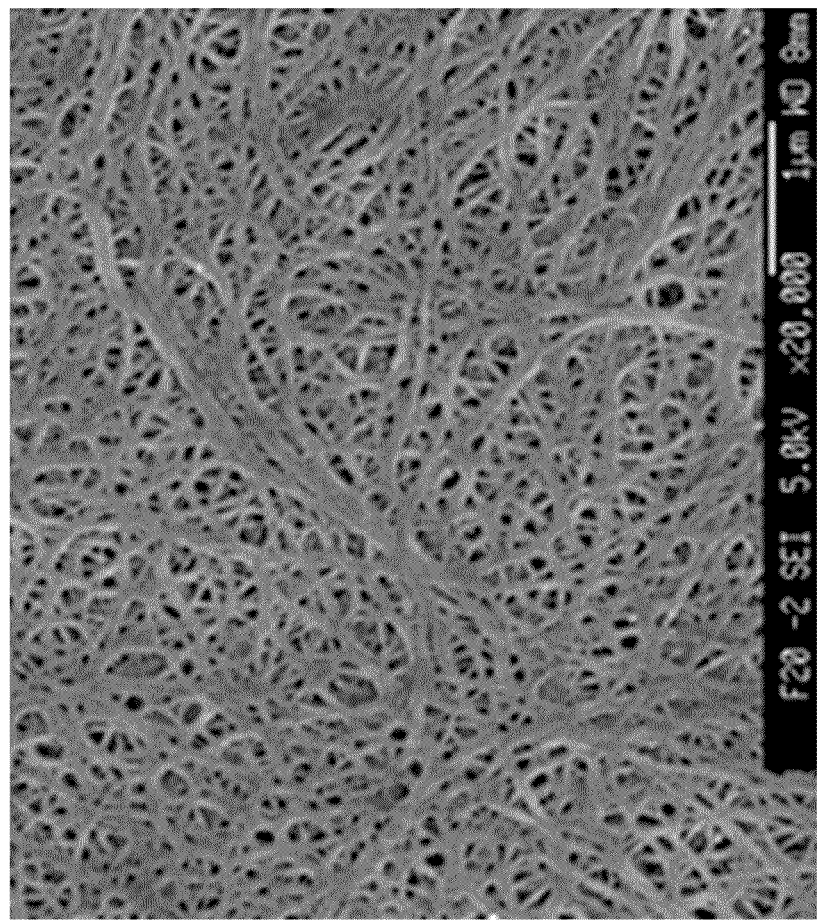

FIG. 5 and FIG. 6 are SEM images of separators obtained from Comparative Examples 1 and 2, respectively.

Experimental Example 2

Evaluation of Cell Performance

A charge and discharge test was performed using 18650 full cells obtained from the Examples and Comparative Examples. The upper limit charge voltage of full cell was set by 4.8V, and the lower limit discharge voltage thereof was set by 3.0V. The charge and discharge cycle was repeated at a room temperature and 45° C.

Figure 7:
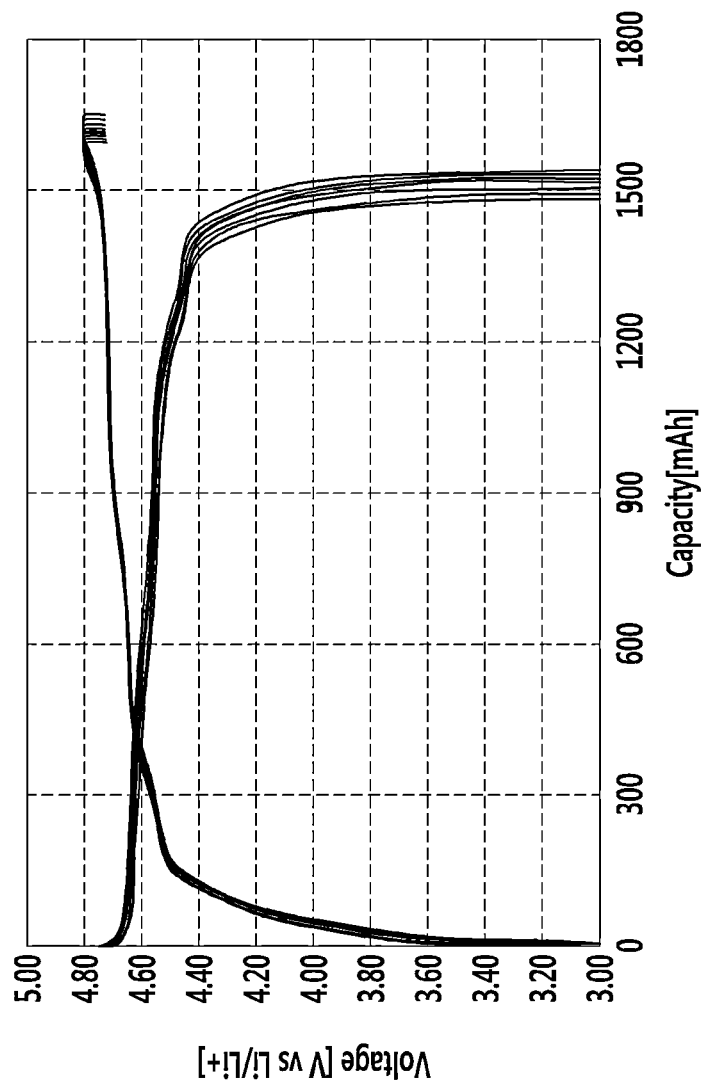
FIG. 7 is a charge and discharge curved line of Examples 1 to 3 and Comparative Examples 1 to 5.

The charge and discharged characteristics were measured by charging the cells according to Examples 1 to 3 and Comparative Examples 1 to 5 at 0.2C and discharging at 0.2C once at room temperature (25° C.). The results are shown in FIG. 7. All 8 full cells had the similar results in the charge and discharge capacity and profile without the significant difference.

Figure 8:
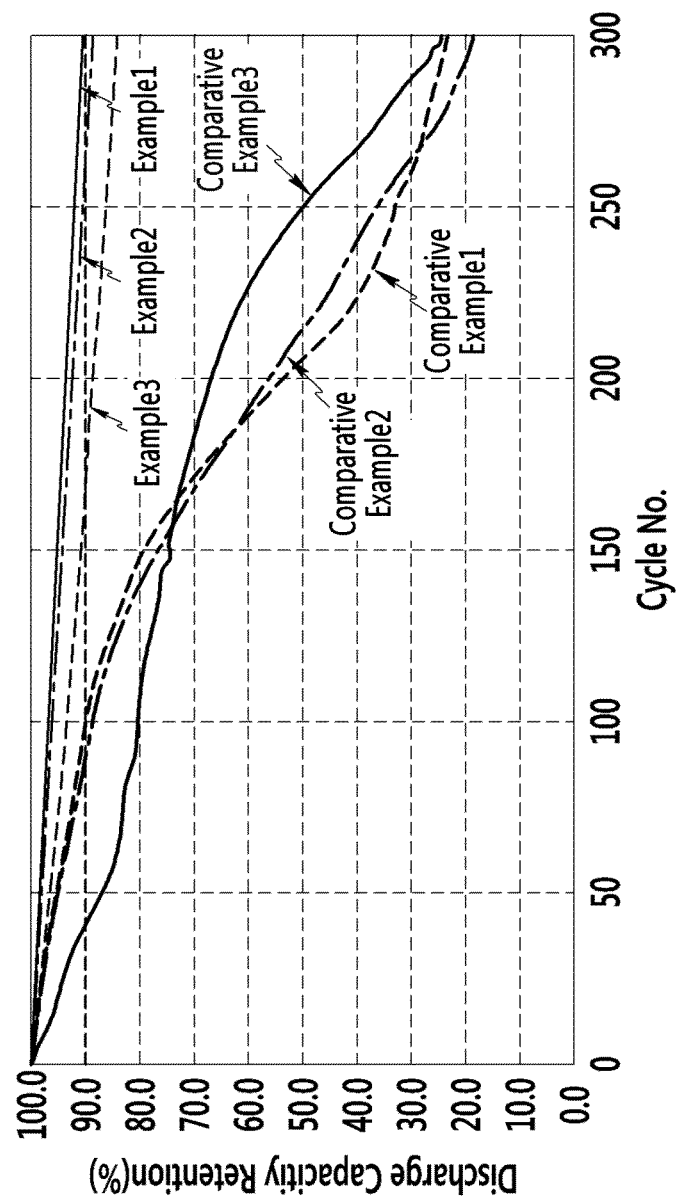
FIG. 8 is a graph showing the room temperature cycle-life evaluation results measured by full cells obtained from Examples 1 to 3 and Comparative Examples 1 to 3.

The cycle-life characteristics cells for the full cells according to Examples 1 to 3 and Comparative Examples 1 to 3 were measured by charging the cells at 1.0C and the discharging at 1.0C for 300 cycles at room temperature (25° C.). The results are shown in FIG. 8.It is confirmed that Examples 1 to 3 showed better cycle-life characteristics than Comparative Examples 1 to 3.

Figure 9:
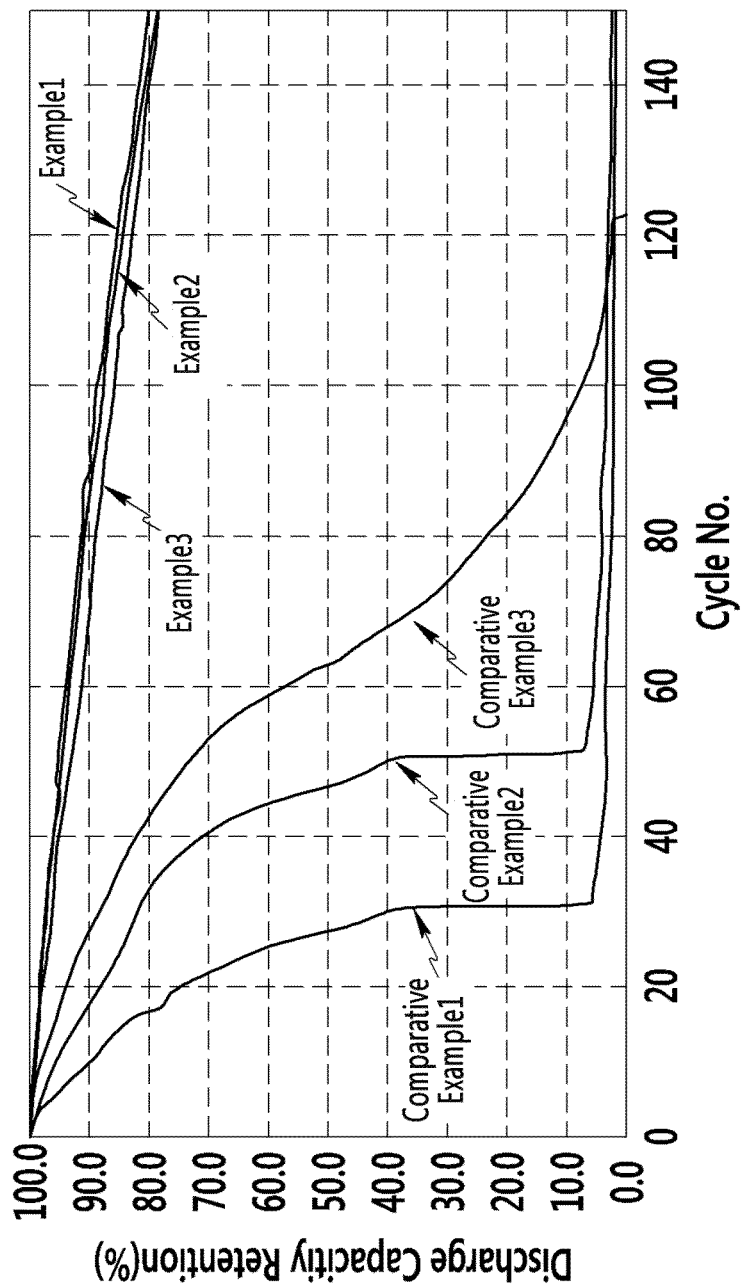
FIG. 9 is a graph showing the 45° C. cycle-life evaluation results measured by full cells obtained from Examples 1 to 3 and Comparative Examples 1 to 3.

The cycle-life characteristics cells for the full cells according to Examples 1 to 3 and Comparative Examples 1 to 3 were measured by charging the cells at 1.0C and the discharging at 1.0C for 150 cycles at 45° C. The results are shown in FIG. 9. Examples 1 to 3 showed the excellent cycle-life characteristics; and particularly Comparative Examples 1 and 2 showed that the cycle-life was remarkably deteriorated according to repeating cycles.

Comparative Example 4

A 18650 cylindrical full cell was fabricated in accordance with the same procedure as in Comparative Example 1, except that the positive active material included 4V spinel-based $LiMn_2O_4$ instead of 5V spinel-based $LiNi_{0.5}Mn_{1.5}O_4$.

Comparative Example 5

A 18650 cylindrical full cell was fabricated in accordance with the same procedure as in Example 1, except that the positive active material included 4V spinel-based $LiMn_2O_4$ instead of 5V spinel-based $LiNi_{0.5}Mn_{1.5}O_4$.

Figure 10:
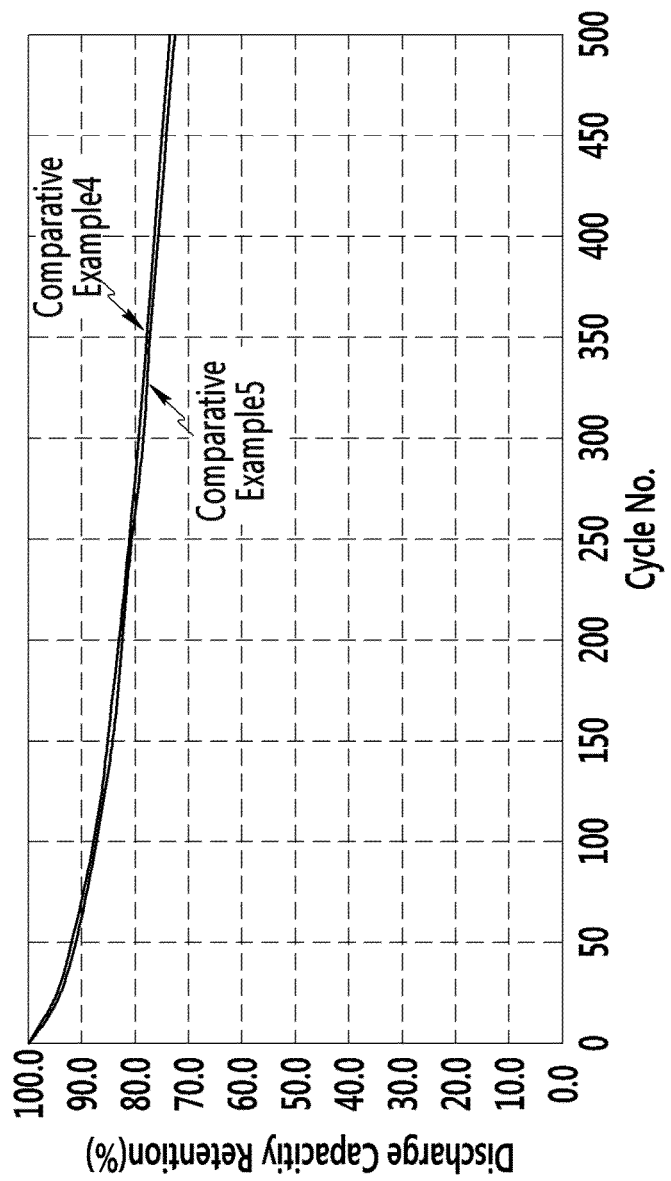
FIG. 10 is a graph showing the 45° C. cycle-life evaluation results measured by the full cells obtained from Comparative Examples 4 and 5.

The charge and discharge cycle was repeated at 45° C. by setting the upper limit charge voltage of 18650 full cells obtained from Comparative Example 4 and Comparative Example 5 by 4.8V and setting the lower limit discharge voltage thereof by 3.0V, and the results are shown in FIG. 10. Comparative Example 5, that replaced the separator of Comparative Example 4 with the separator of Example 1, did not improves the cycle-life characteristics. These results confirm that the desired effects could not obtained only by associating the 4V spinel-based active material and the separator according to Example 1.

Example 4

A 2030 coin-type half cell was fabricated by using the positive electrode according to Example 1, a lithium foil with a thickness of 100 μm counter electrode and the separator according to Example 1.

Experimental Example 3

Discharge Plateau Voltage of Positive Active Material

Figure 11:
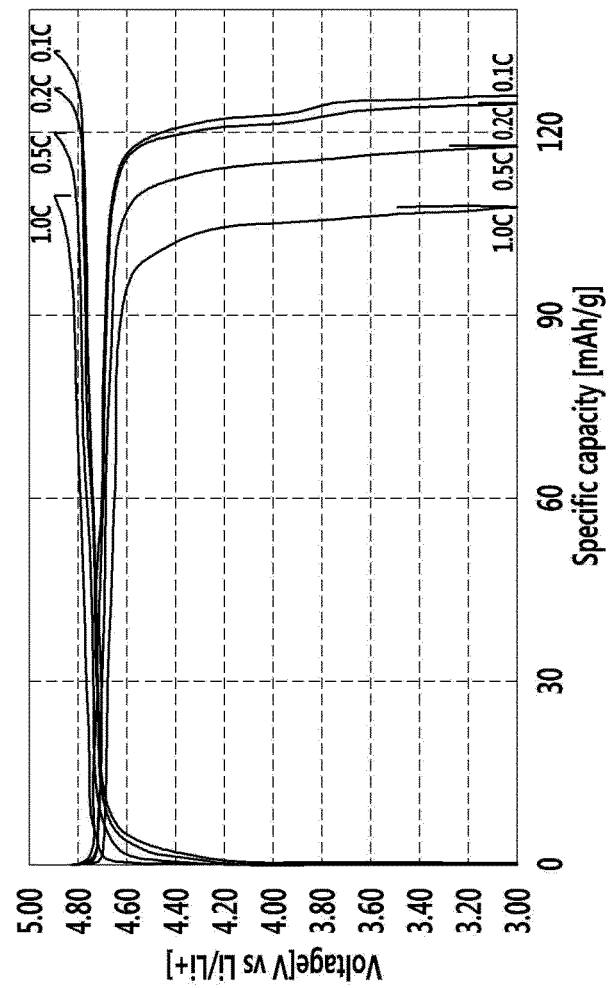
FIG. 11 is a graph showing the charge and discharge characteristics of the half-cell according to Example 4.

The half-cell according to Example 4 was charged and discharged at 0.1C, 0.2 C, 0.5 C, and 1 C, respectively. The results are shown in FIG. 11, in which the positive active material used in Example 1 exhibited the discharge plateau voltage of 4.6V or more.

While the present embodiments have been described in connection with what is presently considered to be practical exemplary embodiments, it is to be understood that the invention is not limited to the disclosed embodiments and is intended to cover various modifications and equivalent arrangements included within the spirit and scope of the appended claims. Therefore, the aforementioned embodiments should be understood to be exemplary but not limiting this disclosure in any way.

What is claimed is:

1. A lithium secondary battery comprising
a positive electrode including a high-voltage positive active material; and
a separator, wherein the separator comprises a substrate of polyethylene, polypropylene, polyvinylidene fluoride, or a multilayer thereof,
wherein the high-voltage positive active material has a discharge plateau voltage of about 4.6V to about 5.3V with respect to a Li counter electrode and the high-voltage positive active material is selected from at least one olivine-based lithium metal phosphate and a compound represented by Chemical Formula 1:

$$Li_{1+x}Ni_yMn_{2-y-z}M_zO_{4+w} \qquad \text{Chemical Formula 1}$$

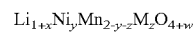

wherein,
0≤x<0.2, 0.4≤y≤0.6, 0≤z≤0.2, 0≤w≤0.1, and
M is selected from the group consisting of Al, Ti, Mg, Zn, and combinations thereof, and
the separator comprises a porous substrate having porosity of about 40% to about 60%; and a coating layer on at least one side of the porous substrate, wherein the coating layer comprises a polymer and a metal filler.

2. The lithium secondary battery of claim 1, wherein the metal filler comprises a component selected from the group consisting of metal oxide, metal hydroxide, metal phosphate, metal nitrate, metal carbonate, metal sulfate, metal alkoxide, metal oxide having a perovskite structure, ceramics, and combinations thereof.

3. The lithium secondary battery of claim 2, wherein the metal filler is $MgCO_3$, $BaCO_3$, $Li_2CO_3$, $Al(OH)_3.H_2O$, $Al_2(SO_4)_3$, $MgSO_4$, $Al(OC_2H_5)_3$, $YPO_4$, $(ZrO)_2P_2O_7$, $ZrP_2O_7$, $Al(NO_3)_3$, a mixture of $Al_2(SO_4)_3$ and $Al(OC_2H_5)_3$, $LiAlO_2$, $LiAl_5O_8$, $Li_5AlO_4$, MgO, $MgAl_2O_4$, $BaTiO_3$, $CoAl_2O_4$, $Li_2SiO_4$, $Li_2B_4O_7$, $Li_2MoO_3$, $Al(OH)_3$, $AlPO_4$, $Mg(OH)_2$, a mixture of $Al_2O_3$ and $AlPO_4$, $Li_2ZrO_3$, a mixture of $Al_2O_3$ and $Al(OH)_3$, $AM^1O_3$ (A=Ca, Ba, Sr, Pb, and the like, $M^1$ =Ti, Zr, Sn, Hf, and the like) or $Al_2O_3$.

4. The lithium secondary battery of claim 3, wherein the metal filler is $Al_2O_3$.

5. The lithium secondary battery of claim 4, wherein the porous substrate comprises polyethylene.

6. The lithium secondary battery of claim 1, wherein the polymer comprises a component selected from the group consisting of polyvinylidenefluoride (PVdF), poly(vinylidene-hexafluoropropylene) co-polymer (P(VdF-HFP)), polyethyleneoxide (PEO), polyacrylonitrile (PAN), polyimide (PI), polyamic acid (PAA), polyamideimide (PAI), and aramid.

7. The lithium secondary battery of claim 6, wherein the polymer is poly(vinylidene-hexafluoropropylene) co-polymer (P(VdF-HFP)).

8. The lithium secondary battery of claim 1, wherein the coating layer comprises about 5 wt % to about 80 wt % of a metal filler based on 100 wt % of the coating layer.

9. The lithium secondary battery of claim 1, wherein the coating layer has a thickness of about 0.05 μm to about 5 μm.

10. The lithium secondary battery of claim 1, wherein the separator has an entire thickness of about 5 μm to about 30 μm.

11. The lithium secondary battery of claim 1, wherein the lithium secondary battery further comprises a negative electrode including a negative active material selected from natural graphite, artificial graphite, soft carbon, hard carbon, a mesophase pitch carbonized product, fired coke, silicon oxide, or silicon oxide coated with conductive carbon, and combinations thereof.

12. The lithium secondary battery of claim 1, wherein the separator comprises a substrate of at least one kind of polyolefin-based monolayer or multilayer;
   the lithium secondary battery further comprises a non-aqueous electrolyte; and
   the non-aqueous electrolyte comprises a supporting electrolytic salt.

13. The lithium secondary battery of claim 12, wherein the supporting electrolytic salt in the non-aqueous electrolyte has a concentration of about 0.5 M to about 2 M.

14. The lithium secondary battery of claim 12, wherein the supporting electrolytic salt is $LiPF_6$.

15. The lithium secondary battery of claim 12, wherein the non-aqueous electrolyte is a mixture of ethyl carbonate, ethylmethyl carbonate and dimethyl carbonate.

16. The lithium secondary battery of claim 1, wherein the high-voltage positive active material is $LiNi_{0.5}Mn_{1.5}O_4$.

* * * * *